US006434540B1

(12) United States Patent
Numaoka

(10) Patent No.: US 6,434,540 B1
(45) Date of Patent: Aug. 13, 2002

(54) HARDWARE OR SOFTWARE ARCHITECTURE IMPLEMENTING SELF-BIASED CONDITIONING

(75) Inventor: Chisato Numaoka, Kanagawa (JP)

(73) Assignee: Sony France, S.A., Cedex (FR)

( * ) Notice: Subject to any disclaimer, the term of this patent is extended or adjusted under 35 U.S.C. 154(b) by 0 days.

(21) Appl. No.: 09/234,178

(22) Filed: Jan. 19, 1999

(30) Foreign Application Priority Data

Jan. 19, 1998 (EP) .............................. 98400092

(51) Int. Cl.[7] .............................. G06F 15/18

(52) U.S. Cl. .............................. 706/25; 706/23

(58) Field of Search .............................. 706/25, 12, 14, 706/16, 23

(56) References Cited

U.S. PATENT DOCUMENTS

| | | | | |
|---|---|---|---|---|
| 5,146,542 A | * | 9/1992 | Engeler ........................ | 706/34 |
| 5,182,794 A | * | 1/1993 | Gasperi et al. ............... | 706/23 |
| 5,313,559 A | * | 5/1994 | Ogata et al. .................. | 706/25 |
| 5,390,284 A | * | 2/1995 | Ogata et al. .................. | 706/25 |
| 5,608,843 A | * | 3/1997 | Baird, III ..................... | 706/25 |
| 5,627,945 A | * | 5/1997 | Cohen .......................... | 706/12 |
| 5,680,513 A | * | 10/1997 | Hyland et al. ................ | 706/23 |
| 5,727,131 A | * | 3/1998 | Nakamura et al. ............ | 706/23 |
| 5,835,902 A | * | 11/1998 | Jannarone .................... | 706/26 |

FOREIGN PATENT DOCUMENTS

EP 0 434 423 A2 6/1991

OTHER PUBLICATIONS

Saffo, P.; "Sensors: The Next Wave of Innovation". Communications of the ACM, Feb. 1997, vol. 40, No. 2, pp. 93–97.*

Windirsch et al.; "Application–specific Microelectronics for Mechatronic Systems". Proceedings of the Conference on European Design Automation, Sep. 1992, pp. 194–199.*

Monti et al.; "Low–Noise Tape Preamplifier with new Self–Biasing Architecture". IEEE Journal of Solid–State Circuits, Jul. 1992, vol. 27, Iss. 7, pp. 966–973.*

Numaoka, C.; "Collective Alteration of Strategic Types with Delayed Global Information". Proceedings of the 1993 IEEE/RSJ International Conference on Intelligent Robots and Systems, Jul. 1993, vol. 2, pp. 1077–1084.*

Maneatis, J.G.; "Low–Jitter Process–Independent DLL and PLL Based on Self–Biased Techniques". IEEE Journal of Solid–State Circuits, Nov. 1996, vol. 31, Iss. 11, pp. 1723–1732.*

(List continued on next page.)

*Primary Examiner*—Thomas Black
*Assistant Examiner*—Kelvin Booker
(74) *Attorney, Agent, or Firm*—Frommer Lawrence & Haug LLP; William S. Frommer; Gordon Kessler

(57) ABSTRACT

An architecture, which may be embodied in hardware, software or a combination of the two, implementing self-biased conditioning and having at least one primary response network (1) comprising: a single activation node (X) responding to a first value of an input signal received from at least one sensor ($S_A$) by outputting a trigger signal ($O_1$), one or more motor centers (M) receiving the trigger signal ($O_1$) and having an innate response to generate an output signal ($O_3$) for activating an actuator ($C_1$), means ($y^+$, $y^-$) for applying positive and negative reinforcement signals to the motor center (M) to promote or inhibit the response of the motor center (M) to the trigger signal ($O_1$), one or more expectation nodes (Y) receiving an input signal from at least one second sensor ($S_B$), and generating an output signal ($O_2$) indicating when the generation of said output signal ($O_3$) for activating the actuator is not appropriate; and an associative memory (2) generating said positive and negative reinforcement signals in response to a determination that the response of the motor center requires promotion or inhibition.

9 Claims, 12 Drawing Sheets

OTHER PUBLICATIONS

Schmajuk N A et al: "Escape avoidance, and imitation: a neural network approach" Adaptive Behavior, Summer 1997, MIT Press, USA, vol. 6, No. 1, ISSN 1059–7123, pp. 63–129, XP002071950.

Barto A G et al: "Neuronlike adaptive elements that can solve difficult learning control problems" IEEE Transactions on Systems, Man and Cybernetics, Sep.–Oct. 1983, USA, vol. SMC—13, No. 5, ISSN 0018–9472, pp. 834–845 XP002071951.

Klopf A. et al: A hierarchical network of control system function during classical and instrumental condidtioning adaptive behavior, MIT Press, vol. 1, No. 3, 1993, USA, pp. 263–319, XP002071952.

* cited by examiner

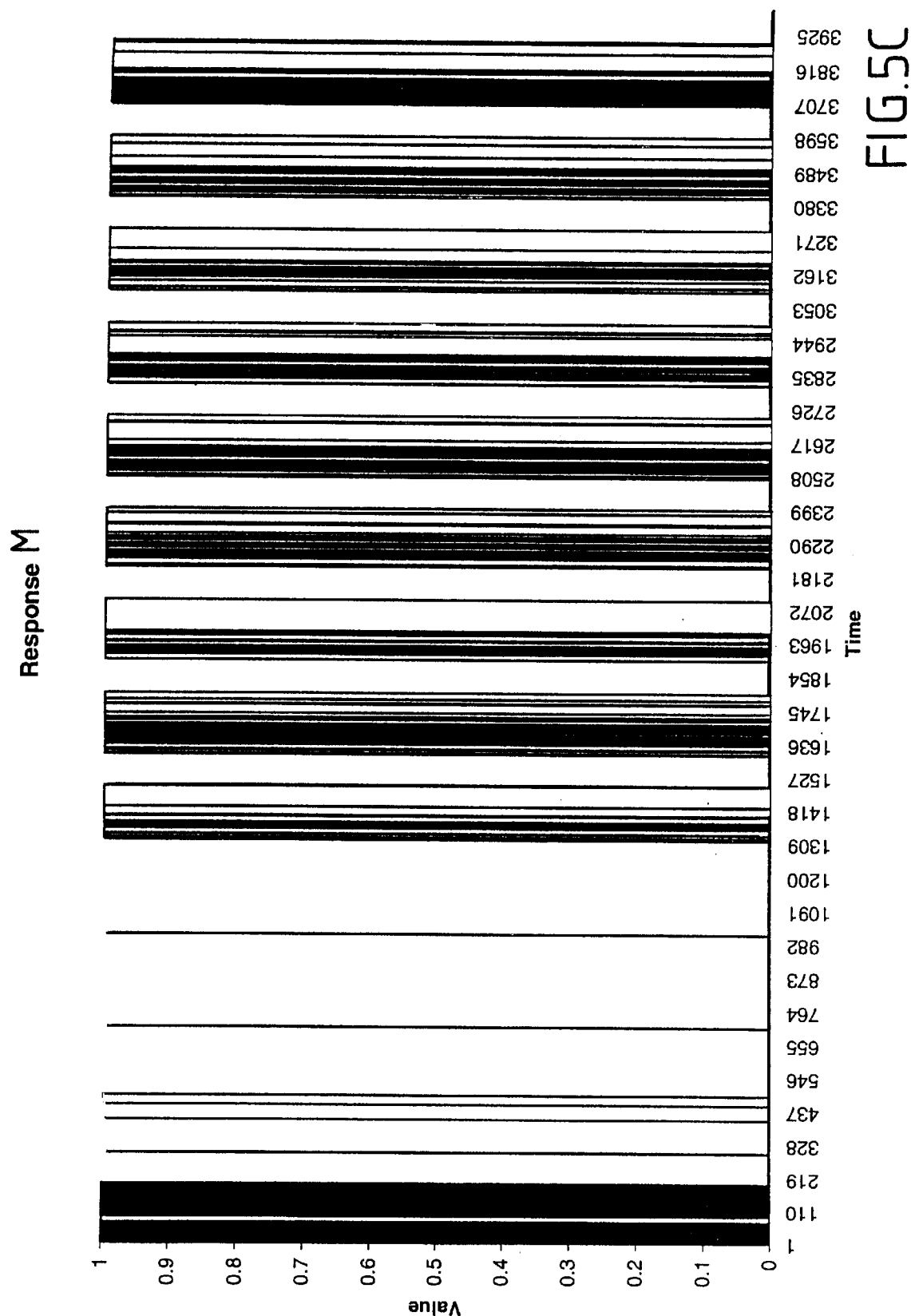

HARDWARE OR SOFTWARE ARCHITECTURE IMPLEMENTING SELF-BIASED CONDITIONING

The present invention relates to an architecture, embodied either in hardware or a software agent or in a combination of hardware and software, adapted to implement self-biased conditioning, that is, an architecture adapted to modify or specialise its responses to particular inputs, dependent upon the circumstances, in the case where the architecture determines that the existing response is inapropriate.

SUMMARY OF THE INVENTION

Such an architecture is of interest for a number of different reasons. Firstly, by being able to modify existing responses to particular inputs, the architecture can adapt itself to changing circumstances and, thus, render its functions better adapted to the achievement of an operational goal. In other words, the architecture can form the basis of an autonomous agent having the ability to perform unsupervised learning. Secondly, an architecture implementing self-biased conditioning appears to a human user to be exhibiting "social intelligence". (In this document, "social intelligence" means the set of skills or responses which enable an agent to interact appropriately with other agents for purposes including but not limited to the achievement of an operational goal.) Thus, the user will find that he can interact in a more intuitive fashion with the machine or programme embodying the architecture and this interaction will be experienced as more congenial.

Moreover, an architecture implementing self-biased conditioning is particularly well adapted to serve as the basis for new products such as "intelligent interfaces" and devices providing "situated personal assistance" (the personal assistance being "situated" in the sense that this assistance is provided in an appropriate context).

SPA (situated personal assistance) devices can take a wide variety of forms. Consider, for example, the needs of a tourist visiting a museum such as the Louvre and having only a small amount of time. It would be useful for such a tourist to have at his disposal a device, personalised to know his tastes, capable of indicating items in the museum which are worth his attention. In theory such a device could be created by providing a computer device having access to a database storing details of the floor plan of the Louvre and its exhibits (as well as other museums and the like which the tourist may visit) and preprogramming the computer with rules indicating the user's interests. However, such an approach requires a considerable amount of pre-programming and information gathering, both by the device's designer and by the user. An SPA device having an initial criterion for identifying objects of potential interest to the user, and capable of interacting with the user to learn the user's preferences, is much more interesting. The present invention enables such devices to be made.

The present invention is based on an analysis of social intelligence in animals and humans which leads to the identification of a set of rules or requirements which should be met by an architecture which seeks to give the appearance of social intelligence. However, it is not suggested that these rules or the architecture proposed according to the invention directly correspond to any particular structure or function of the human or animal brain.

Traditionally in the field of artificial intelligence (AI), the attempts that have been made to create structures emulating human cognitive processes have ignored the "social" aspect of much of human behaviour. The typical attitude is reflected by the statements "systems are social if their learning process is connected with its social surrounding" and "for many purposes of cognitive simulation, it is of no special significance that thought is social" made in the article "Situated Action: A Symbolic Interpretation" by A. H. Vera and H. A. Simon, in the journal Cognitive Science, 17, (1993), pages 7–48. However, as Vera and Simon also recognise "All human behaviour is social. First and foremost, it is social because almost all the contents of memory, which provide half of the con text of behaviour, are acquired through social processes—processes of learning through instruction and social interaction." Moreover, the importance of the ability to interact appropriately with external agents is seen time and time again in the human and animal kingdom in such activities as foraging, mating, imitation, and expressions and experiences of emotion and sympathy.

Recently, some work in this sphere has been attempted, principally with regard to organisational strategy ("Representing and Using Organizational Knowledge in DAI Systems" by L. Gasser, in "Distributed Artificial Intelligence II" pages 55–78, ed. L. Gasser and M. N. Huhns, 1989, pub. Morgan Kaufmann) or study of group behaviour in the field of behaviour-based AI ("Behaviour-based Artificial Intelligence" by P. Maes, in "From animals to animats" 2, pages 2–10, ed. J-A Meyer, H. L. Roitblat and S. W. Wilson, 1993, the MIT Press).

Considering collective or "social" behaviour in the human and animal kingdom it can be postulated that such behaviour is based, at least in part, on a set of innate responses or behaviour patterns which are present from birth. For example, the mating behaviour of the fly Drosophila melanogaster appears to be genetically determined: the mutation of a gene controlling mating behaviour can cause reproductive isolation ("Isolation of mating behaviour mutations in Drosophila melanogaster" by E. Nitasaka in "Proceedings of the Third International Meeting of the Society for Molecular Biology and Evolution", 1995, pages 63–64). Moreover, in humans it has been found that damage to a certain portion of the brain leads to defective social behaviour ("Descartes Error" by A. R. Damasio, 1994, Avon Books).

It can be hypothesised on this basis that social behaviour has two innate requirements:
(1) the ability for agents to observe their own actions and those of other agents, and
(2) the possession of a set of primitive responsive behaviour routines.

A "subsumption" architecture meeting the above requirement (2) has been proposed in the article "A Robust Layered Control System For A Mobile Robot" by R. A. Brooks, IEEE Journal of Robotics and Automation, RA-2(1), pages 14–23, 1986. Moreover, an architecture meeting the above requirements (1) and (2) has been proposed by the present inventor in "Phase Transitions in Instigated Collective Decision Making", in "Adaptive Behaviour", 3(2), 1995, pages 185–223.

BACKGROUND OF THE INVENTION

However, in general it is not possible to pre-program a set of routines or responses which will be appropriate in all the circumstances which a machine or computer program will encounter in practice. Moreover, in the human and animal kingdom genetic information does not provide behavioural responses appropriate for all circumstances which will be encountered during life.

Observation shows that in the human and animal kingdom there is an additional factor, namely the ability to specialise the innate primitive responses based upon experience and, in particular, based on interactions with others. A typical example of this ability is seen in the behaviour of young vervet monkeys. Initially, young vervet monkeys produce an alarm call when they see any flying birds, including ones which are harmless. However, they quickly learn to emit the alarm call only when flying predators are seen, much too quickly to be explained by the young monkey's own experience. It has been postulated that the young monkeys learn to specialise their responses based on the responses of their older peers who ignore the "false alarms" (see "The ontogeny of vervet monkey alarm calling behaviour: A preliminary report" by R. M. Seyfarth & D. L. Cheney, in "z. Tierpsychology", 1980, 54, pages 37–56).

A third requirement for "social intelligence" or appropriate social behaviour can thus be postulated:

(3) the ability to specialise responses originally triggered by primitive responsive behaviour, through interaction with others, and to remember the behavioural pattern as a secondary response.

The creation of a secondary response involves conditioning based upon inputs received from the outside. The generation of secondary responses represents conditioning of a system. Now, the ability to develop secondary responses based on sensory inputs in an unsupervised learning process involves the learning agent in an attempt to correlate a number of sensory inputs with a number of internal structures in an attempt to extend the knowledge base of the system. However, the computations involved in this correlation process are complicated.

A "focus of attention" method for unsupervised learning has been proposed in "Paying Attention to What's Important: Using Focus of Attention to Improve Unsupervised Learning" by L. N. Foner and P. Maes, in "From animals to animats" 3, pages 256–265, ed. D. Cliff, P. Husbands, J. A. Meyer, and S. W. Wilson, 1994, the MIT Press. This method seeks to make the correlation task manageable by focusing attention on a limited number of factors. The proposed method is based on cognitive selectivity and employs world-dependent, goal-independent and domain-independent strategies.

An associative control process (ACP) for conditioning has been proposed in "Modelling Nervous System Function with a Hierarchical Network of Control Systems that Learn" by Klopf et al, in "From animals to animats" 2, pages 254–261, ed. J-A Meyer, H. L. Roitblat and S. W. Wilson, 1993, the MIT Press). The proposed ACP network includes two kinds of learning mechanisms, drive-reinforcement learning (in reinforcement centres) and motor learning (in motor centres). However, the proposed system lacks an internal driving force inciting the network to undergo conditioning and has no mechanism for focusing attention whereby to reduce the complexity of the correlation processes inherent in conditioning.

Another conditioning system is proposed in "No Bad Dogs: Ethological Lessons for Learning in Hamsterdam" by B. M. Todd and P. Maes, in "From animals to animats" 4, pages 295–304, ed. P. Maes, M. Mataric, J. Meyer, J. Pollack and S. W. Wilson, 1996, the MIT Press. This method involves the use of pre-defined "Behaviours" which are arranged in Behaviour Groups so as to be mutually inhibiting. The Behaviour Groups in their turn are arranged in a loose hierarchical fashion. The resultant structure is very complex.

The article "Reinforcement leaning: A Survey" by L. P. Kaelbling, et al in the Journal of Artificial Intelligence Research", 1996, 4, pages 237–285, discusses a process whereby an agent can learn behaviour through trial-and-error interactions with a dynamic environment. This is a type of unsupervised learning. In each of a succession of time periods, the agent receives a set of inputs as well as a reinforcement signal (a "reward") and chooses an action. If the action is successful then the "reward" is allotted equally to all of the units which contributed to the choice of the action. The agent seeks to choose the action which increases the long-term sum of values of the reward, that is, of the reinforcement signal. It will be seen that, according to this proposal, the system conditions itself (adapts its responses to external stimuli) without external motivation, seeking merely to maximise an internal measure of the "success" of its action. However, such an approach does not take into account whether or not the conditioned response is "appropriate" or "successful" from the point of view of external agents with which the system interacts.

In the opinion of the present inventor, an agent emulating "social intelligence" not only should meet the above requirements (1) and (2) but also should meet a modified version of the third requirement, stated as follows:

(3') the ability to specialise responses originally triggered by primitive responsive behaviour, by reacting to the presence or absence of some expected inputs from the outside (typically from others), and to remember the behavioural pattern as a secondary response.

More especially, the agent or architecture emulating "social intelligence" should be adapted to expect a particular type of input in cases where its response is "appropriate" (or "successful" or "normal") from the point of view of external agents with which it interacts and, depending upon whether or not the expected input is received, to specialise its responses to adapt them to the circumstances.

The present invention seeks to provide an architecture meeting the above requirements (1), (2) and (3'). By meeting these three requirements, the architecture according to the invention both is self-conditioning, that is it has an internal driving force promoting conditioning, and it selectively performs this conditioning based upon whether or not its existing responses are "appropriate" or "normal".

More particularly, the present invention provides a system implementing self-biased conditioning, comprising: a plurality of sensors; at least one actuator; at least one primary response network receiving an input signal from at least one first sensor and an input signal from at least one second sensor and generating an output signal for activating an actuator, wherein the primary response network comprises: an activation node receiving the input signal from said at least one first sensor and, in response to a first value of said input signal, outputting a trigger signal, at least one motor centre receiving the trigger signal from the activation node and adapted to respond to the trigger signal by generating said output signal for activating said actuator, means for applying positive and negative reinforcement signals to the motor centre whereby to promote or inhibit the response of the motor centre to the trigger signal from the activation node, and at least one expectation node receiving the input signal from the at least one second sensor, said input signal from the second sensor being indicative of whether or not the generation of said output signal for activating the actuator is appropriate, and for generating an output signal indicating when the generation of said output signal for activating the actuator is not appropriate; means for determining, based on an analysis of at least signals output by the expectation node and motor centre of the primary response network, that the response of the motor centre requires promotion or inhibition; and an associative memory generating said positive and negative reinforcement signals based upon the determination made by the determination means.

It could be considered that the present invention has a learning mechanism having similarities with the above-discussed ACP networks, but associated with an internal driving force and a "focus of attention" mechanism. Moreover, in the architecture according to the present invention there is a separation of "innate" responses (primary response networks) from the "learnable" or "conditionable" part (the associative memory), which makes it possible to achieve an adaptive modular system. In effect, each primary response network is a building block of an adaptive system.

It could be considered that Brooks' subsumption architecture is an example of modularization for constructing behaviour-based adaptive systems. However, the composition of one behavioural layer in terms of very fine-grained units, known as FSAs produces a problem in terms of functional decomposition. More particularly, a single behavioural layer is not allowed to change its functional character. By way of contrast, in the self-biased conditioning architecture of the present invention there are primary response networks as basic units of instinctive behaviour. The units themselves do not change in run-time but their functional character changes over time. The nature of self-biased conditioning allows the system to develop a secondary response, which partly corresponds to a functional decomposition, based on a single primary response network. Thus the self-biased conditioning network serves as a better basis for developing adaptive systems, particularly modular ones.

Other advantageous features of embodiments of the invention are recited in the dependent claims appended hereto.

Further features and advantages of the present invention will become clear from the following description of preferred embodiments thereof, given by way of example, illustrated by the accompanying drawings, in which:

THE DESCRIPTION OF THE DRAWINGS

Figure 10:
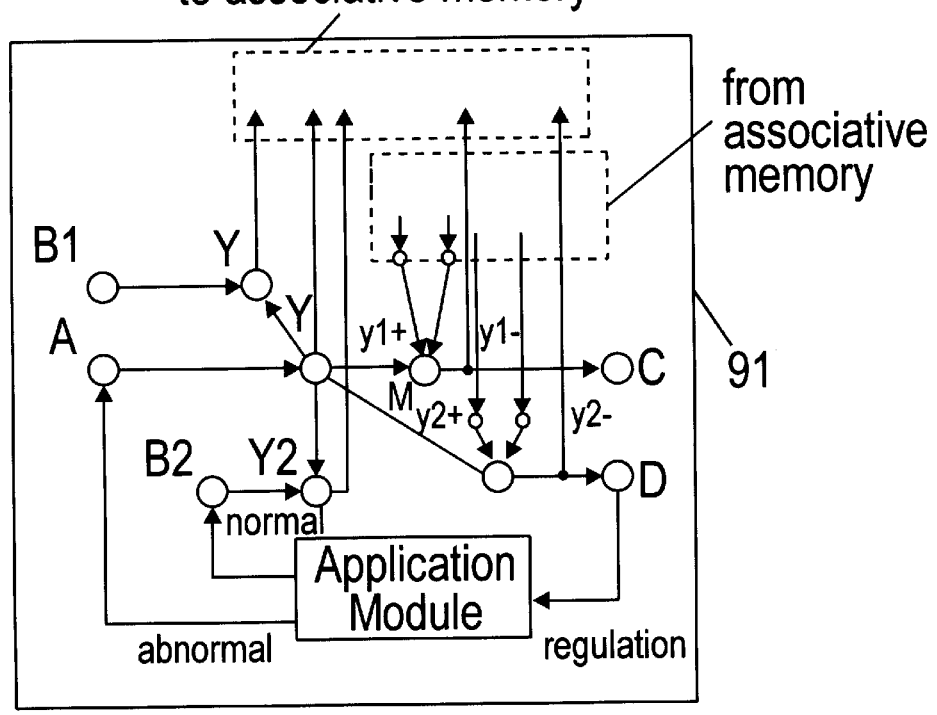
Figure 9:
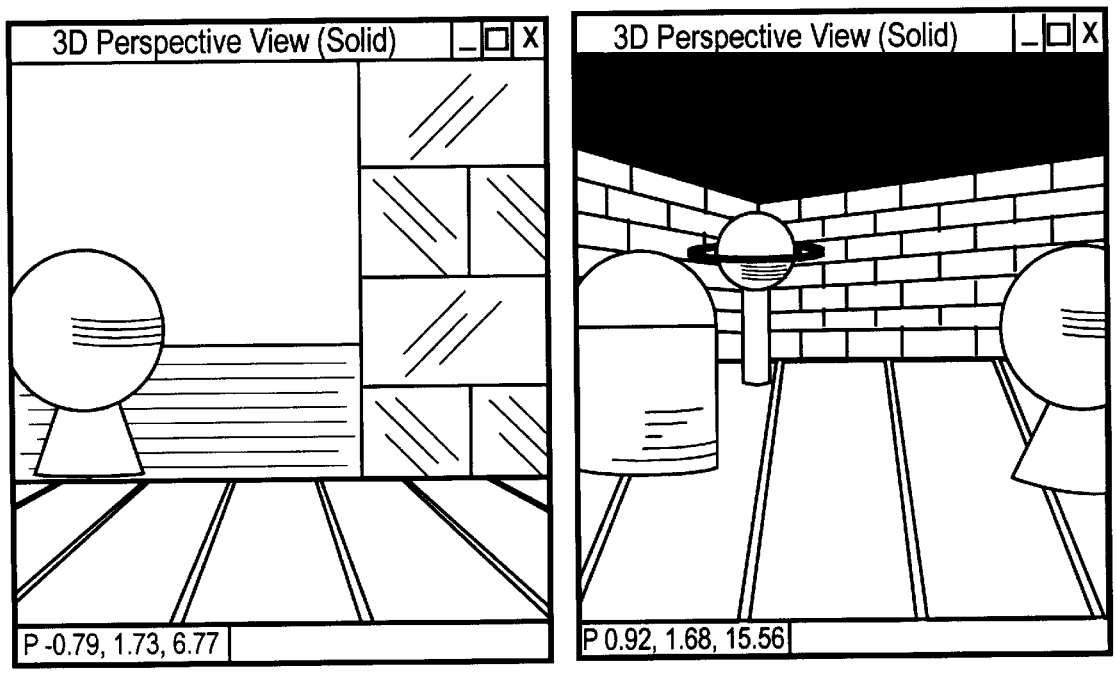

FIG. 9 is a diagram useful for understanding an application of the architecture of the present invention in a device providing situated personal assistance to a user; and FIG. 10 is an example of a primary response network adapted to optimise an output so as to maximise the probability that external aid will be received, leading to a sympathetic coupling between the architecture and an external agent.

DETAILED DESCRIPTION OF THE PREFERRED EMBODIMENTS

The basic structure and operation of an architecture implementing self-biased conditioning, according to a preferred embodiment of the invention, will now be described with reference to FIGS. 1 to 3.

The structure of the preferred embodiment of architecture will first be discussed with reference to FIGS. 1 to 3. As shown in FIG. 1, this architecture comprises a plurality of sensors $S_1$, $S_2$, ..., $S_N$, $S_A$ and $S_B$, and a plurality of actuators $C_1$ to $C_Q$. The sensors are quite general and can include sensors detecting internal states of the architecture itself and/or sensors detecting parameters of the environment external to the architecture. Similarly, the actuators can include units having an effect on the operation of the architecture itself and/or units interacting with the environment.

Figure 1:
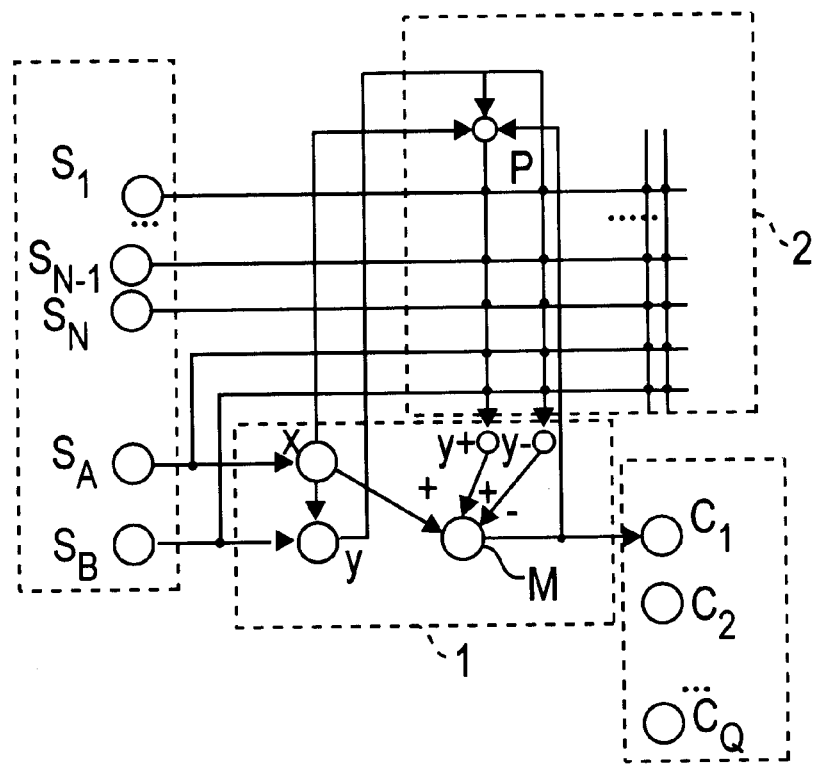
FIG. 1 is a diagram illustrating the base components of an architecture implementing self-biased conditioning, according to the preferred embodiment of the present invention.

At least one primary response network 1 is provided controlling the operation of one or more of the actuators ($C_1$ in FIG. 1) based upon an input signal received from at least one of the sensors ($S_A$ in FIG. 1). The primary response network is initially designed or programmed to implement a particular function, that is, to produce an output which is a particular function of the input received from the connected sensor or sensors.

The primary response network 1 receives at least one further input ($I_2$), from a further sensor ($S_B$ in FIG. 1), determining (or indicating) whether or not the environment exhibits an expected reaction (or behaviour) consistent with an action of this primary response network. An associative memory 2 is also provided, for correlating the input and output signals from the primary response network 1 in order to condition the behaviour of the primary response network to inputs from other sensors (e.g. $S_2$ and $S_4$), either when the further input to the primary response network indicates that the working environment does not exhibit any expected reaction (or behaviour), or when the output of M is not that which is expected.

The structure and function of the primary response network 1 will now be described in greater detail with reference to FIG. 2.

Figure 2:
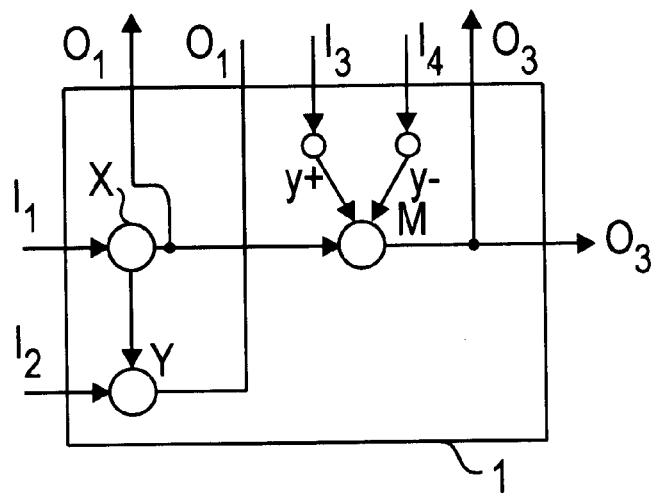
FIG. 2 is a diagram illustrating the structure of a primary response network used in the architecture of FIG. 1.

As shown in FIG. 2, the primary response network 1 includes three types of nodes: activation nodes X, expectation nodes Y and motor centres M. More particularly, a primary response network 1 includes at least one activation node X receiving an input signal $I_1$ from one or more sensors and generating an output $O_1$ dependent upon the value(s) of the input signal(s) $I_1$ it receives. The output $O_1$ of the activation node X is fed to one or more motor centres M in order directly to trigger the motor centre(s) dependent upon the value of the signal(s) $I_1$ received from the sensor(s). The motor centre M is also connected to positive and negative reinforcement terminals $y^+$ and $y^-$ which provide respective signals $I_3$ and $I_4$ which affect the likelihood of the motor centre being triggered by the signal $O_1$ output by the activation node X. The output $O_3$ of the motor centre M serves as the output of the primary response network and controls operation of one or more actuators.

According to the preferred embodiment of the invention, when the activation node X receives an input signal $I_1$ taking a particular value, it outputs a signal $O_1$ taking a value adapted to trigger the motor centre M. It also outputs a (Boolean value) control signal, which is different from $O_1$, and feeds this to the expectation node Y whereby to activate the expectation node. The expectation node Y is adapted to expect to receive an input signal $I_1$ taking a particular value at times when the corresponding primary response network is (or should be) in operation. When triggered by the activation node X, the expectation node Y monitors the value of the received signal $I_2$ and outputs a signal $O_2$ whose value depends upon whether the expected value of the received signal $I_2$ is or is not detected (in the example discussed here, $O_2$ preferably takes the value +1.0 when the expectation fails and 0 otherwise).

The signals $O_1$, $O_2$ and $O_3$ output by the activation node X, expectation node Y and motor centre M are sent to the associative memory 2 and influence the values of the signals $I_3$ and $I_4$ generated at the positive and negative reinforcement terminals $y^+$ and $y^-$ as will be explained in greater detail below.

In the preferred embodiment of the present invention, the probability that the motor centre will fire follows equation (1) below:

$$\text{Prob}(t) = \begin{cases} 1.0 - \dfrac{y^-(t)}{X(t) + y^+(t)} & \text{if } X(t) + y^+(t) > 0.0 \\ 0.0 & \text{otherwise} \end{cases} \quad (1)$$

where X(t) is the output of the activation node at a time t, $y^+(t)$ is the value of the positive reinforcement signal at terminal $y^+$ at time t, and $y^-(t)$ is the value of the negative reinforcement signal at terminal $y^-$ at time t.

It will be seen that motor centre output is a simple primary response which is affected by the values of the positive and negative reinforcement signals. These positive and negative reinforcement signals are generated by the associative memory 2 as will now be explained referring to FIG. 3 which illustrates that portion of the associative memory 2 which corresponds to the primary response network 1 of FIG. 2.

The associative memory 2 has a matrix structure and includes a plurality of input signal lines $4_1$, $4_2$, ..., $4_N$ receiving inputs from respective sensors $S_1$ to $S_N$, and a pair of output signal lines 5, 6 for each motor centre M. In the preferred embodiment of the invention, all of the input signal lines $4_1$, $4_2$, ..., $4_N$ are connected to the pair of output signal lines 5, 6 supplying a particular motor centre and each signal line $4_1$ to $4_N$ generates a weighted contribution to the output on the respective signal line 5, 6. The output signal lines 5, 6 are respectively connected to the positive and negative reinforcement terminals $y^+$ and $y^-$ of the motor centre M and feed positive and negative reinforcement signals thereto.

In theory, a pre-selection could be made of a sub-set of sensors whose outputs are expected to be relevant to the functioning of the primary response network, and only this sub-set of sensors would be connected to the signal lines 5 and 6 connected to the primary response network. However, it is preferred to connect all of the sensors $S_1$ to $S_N$ to all of the signal lines 5 and 6 and to allow conditioning to determine which sensors are relevant.

Figure 3:
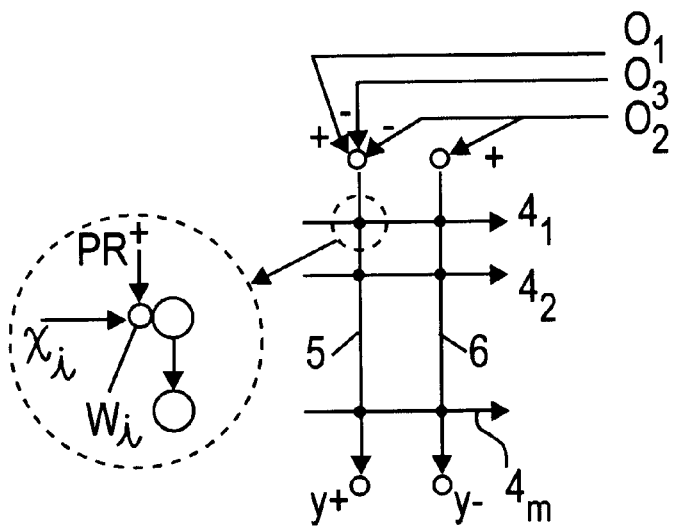
FIG. 3 is a diagram illustrating the structure of a portion of the associative memory used in the architecture of FIG. 1.

Considering FIG. 3 in more detail, it will be seen that the signal $x_i(t)$ output by sensor $S_i$ at a time t contributes a weighted component $w_i^+(t)x_i(t)$ to the output on signal line 5, where $w_i^+(t)$ is the value of the weight applicable to the signal from sensor $S_i$ at time t when contributing to the positive reinforcement signal. Similarly, the signal $x_i(t)$ output by sensor $S_i$ at time t contributes a weighted component $w_i^-(t)x_i(t)$ to the output on signal line 6, where $w_i^-(t)$ is the value of the weight applicable to the signal from sensor $S_i$ at time t when contributing to the negative reinforcement signal.

The positive reinforcement signal output on line 5 is the sum of the components contributed from all of the applicable sensors and may be expressed:

$$y^+(t) = \sum_{i=1}^{N} w_i^+(t)x_i(t) \quad (2)$$

Similarly, the negative reinforcement signal output on line 6 is the sum of the components contributed from all of the applicable sensors and may be expressed:

$$y^-(t) = \sum_{i=1}^{N} w_i^-(t)x_i(t) \quad (3)$$

The positive reinforcement and negative reinforcement weights applied to the signals on the different signal lines $4_1$ to $4_N$, are modified at times when a respective update signal PR+ or PR− is generated. These update signals are generated selectively depending upon the values of the signals $O_1$, $O_2$ and $O_3$ output by the activation node X, expectation node Y and motor centre M of the corresponding primary response network. More particularly, as will be explained in greater detail below, in this example the weight update signals PR+ and PR− are generated at times when the outputs $O_1$ and $O_3$ from the activation node X and motor centre M are not consistent with "expected" behaviour as indicated by the value of the output $O_2$ from the expectation node Y.

It will be understood from the above equations (2) and (3) that the positive and negative reinforcement signals affect the behaviour of the primary response network by introducing a dependence upon signals received from sensors other than those directly connected to the primary response network. In other words, the innate function of the primary response network 1 tending to activate the actuator $C_1$ upon reception of a signal from sensor $S_A$, is inhibited or promoted depending upon signals received from sensors other than $S_A$. The way in which the signals received from the "other" sensors inhibit or promote the primary response of the primary response network represents the conditioning which the architecture has experienced. This conditioning is developed by the system itself, dependent upon $O_1$ to $O_3$, in the manner described below.

Initially, when operation of the architecture begins, the primary response of the primary response network is un-specialised, that is, there are no positive and negative reinforcement signals applied to the motor centre M and all of the weights applied in the associative memory take values which are zero or negligibly low (for example, 0.01).

When the activation node X receives an input signal $I_1$ (or set of input signals) apt to trigger the primary response, it outputs a trigger signal ($O_1$=+1.0 in this embodiment) to the motor centre M which responds by outputting a signal ($O_3$=+1.0 in this embodiment) adapted for activating the actuator $C_1$. The activation node X also activates the expectation node Y which, when activated monitors the input thereto $I_2$ in order to verify whether this input indicates that the primary response of the network is "appropriate" or "normal" at this time. If the expectation node determines that the signal $I_2$ takes the "expected" value or pattern of values, then the output $O_2$ of the expectation node Y represents this determination, for example by taking a value 0. However, if the expectation node Y determines that the signal $I_2$ does not takes the "expected" value or pattern of values, then the output $O_2$ of the expectation node Y changes so as to reflect this finding, for example, by taking a value +1.0.

The output signals $O_1$, $O_2$ and $O_3$ from the activation node X, expectation node Y and the motor centre M are received by the associative memory and serve to generate the update signals PR+ and PR− if the behaviour of the primary response network is "abnormal". The behaviour of the primary response network can be "abnormal" in a number of different ways. For example, the behaviour of the primary response network is "abnormal" either if:

a) the motor centre M is triggered at times when the expectation node Y determines that it should not be triggered—in which case it is necessary to inhibit the triggering of the motor centre M by increasing the value of the negative reinforcement signal $I_4$ applied to the negative reinforcement terminal y−, or b) the motor centre M is not triggered at times when the expectation node Y determines that it should be triggered—in which case it is necessary to promote the triggering of the motor centre M by increasing the value of the positive reinforcement signal $I_3$ applied to the positive reinforcement terminal y+.

In the present embodiment, the update signals PR+ and PR− can be generated in a very simple manner. More particularly, the update signal PR+ can be generated when $O_1 - O_2 - O_3 > Th_1$, and the update signal PR− can be generated when $O_2 > Th_2$, (4), where $Th_1$ and $Th_2$ are threshold levels which can be set different from one another but which, in this particular case, are both set to 0.0. (recalling that the expectation node will output a signal $O_2 = +1.0$ at times when it is not appropriate for the primary response network to trigger the motor centre M).

At a time when the weight update signal PR+ is generated, the positive reinforcement weights applied to the signals output by the sensors $S_1$ to $S_N$ are updated, for example taking into account the values of the signals output by the sensors $S_1$ to $S_N$ at that time. In other words, the primary response network is conditioned such that its primary response is promoted or reinforced taking into account the values of the signals output by those of the sensors $S_1$ to $S_N$ which had a large-value signal at the times when the weight update signal PR+ was generated.

Similarly, at a time when the weight update signal PR− is generated, the negative reinforcement weights applied to the signals output by the sensors $S_1$ to $S_N$ are updated, for example taking into account the value of the signals output by the sensors $S_1$ to $S_N$ at that time. In other words, the primary response network is conditioned such that its primary response is inhibited taking into account the values of the signals output by those of the sensors $S_1$ to $S_N$ which had a large-value of the signal at the times when the weight update signal PR− was generated.

It has been found to be advantageous to update the positive and negative reinforcement weights in a manner which takes into account not only the values of the signals output by the sensors $S_1$ to $S_N$ at the time when the weight update signals are generated but also the values of these signals over a number of preceding time intervals. More particularly, the change in the value of the positive (or negative) reinforcement weight is preferably calculated according to the following equation:

$$\Delta w_i(t) = g \sum_{j=1}^{\tau} c_j |w_i(t-j)| [\Delta x_i(t-j)]^+ \quad (5)$$

where $[\Delta x_i(t-j)]^+ = \max(\Delta x_i(t-j), 0)$, $\Delta w_i(t)$ represents the change made at time t to the weight applied to the $4_i$th signal line (that is, the change in the value of the weight applied for time interval t and that applied at t+1, that is one time interval later), $\Delta x_i(t-j)$ represents the change observed at time interval (t−j) in the value of the signal $x_i$ output by the sensor $S_i$ (that is, the change in the value of the signal $x_i$ between that observed during time interval t−j−1 and that observed during time interval t−j), $\tau$ is a time period (equal to an integral number of time intervals) over which delay conditioning is effective, $c_j$ is an empirically-determined learning-rate constant that is proportional to the effectiveness of the conditioning when the inter-stimulus interval is j, and g is 1 when the weight update signal is produced and 0 when the weight update signal is not produced.

Although in the above-described example the output signals $O_1$ to $O_3$ are all binary, the present invention is not limited to such a case. Moreover, numerous other detailed changes may be made in the precise implementation of the architecture. For example, the weight update signal PR+ and PR− can be calculated in different fashions. In the above example, PR+ could be generated in the case where $O_2 = O_3 = 0.0$ and PR− could be generated in a case where $O_2 = O_3 = 1.0$.

Examples of different applications of the above-described architecture will now be described in order to aid understanding of the function and utility of the present invention.

Alarm Generation

Figure 4:
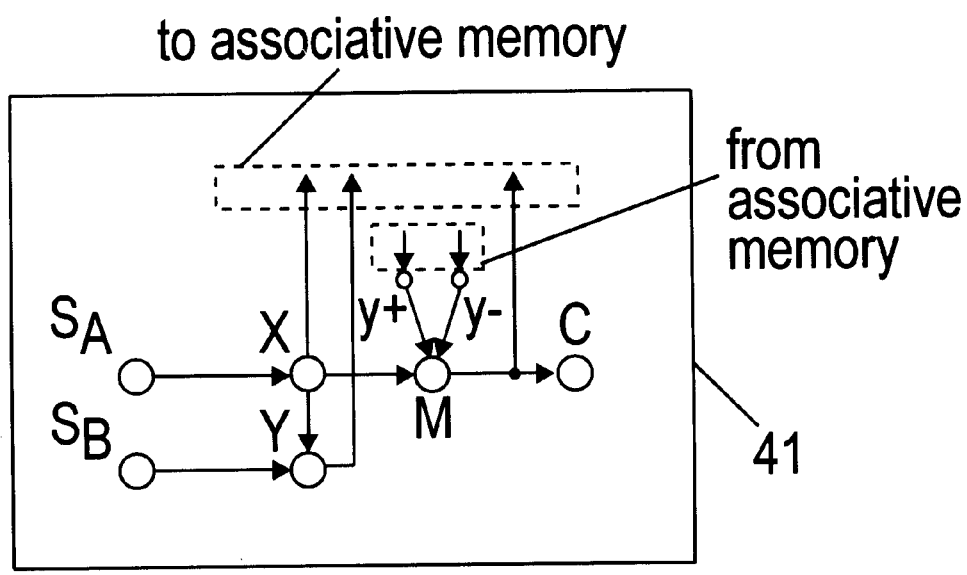
FIG. 4 is an example of a primary response network adapted to output an alarm signal.

FIG. 4 illustrates the structure of a primary response network 41 adapted for use in an alarm device which implements self-biased conditioning so as to modify its alarm-generation function to take into account factors other than those indicated by its initial programming or design. This primary response network 41 will first be described in the context of a smoke alarm device and then there will be a discussion of experimental results obtained in a simulation based on a substantially similar architecture applied in the context of generation of "eagle alarm calls". In a third section, an SPA device using alarm signals will be described.

Smoke Detector

The primary response network 41 of FIG. 4 comprises a single activation node X, a single expectation node Y and a single motor centre M. The activation node X receives an input signal from an ion detector $S_A$ (of the type used in conventional smoke detectors). When the signal received from the ion detector exceeds a threshold level the activation node X is designed to output a signal triggering the motor centre M which, in turn, is designed to activate a device C generating an audible alarm signal. When the activation node X is triggered it, in its turn, activates the expectation node Y. The expectation node Y monitors audio signals detected by a microphone/audio signal processing device $S_B$. In this embodiment, the expectation node Y is adapted to output a signal indicating that the primary response of the primary response network is inappropriate if the signal received via the microphone/audio processing device $S_B$ indicates that a person in the vicinity has spoken the words "false alarm". It will be appreciated that the activation of the motor centre M should be inhibited in such circumstances.

This is achieved by operation of the associative memory which augments the value of the negative reinforcement signal applied to the negative reinforcement node y−.

Similarly, in a case where the activation node X has triggered, no-one has spoken the words "false alarm", but the motor centre M has not triggered the generation of the audible alarm, this also represents "abnormal" or "inappropriate" behaviour of the device. In such a case, activation of the motor centre M should be promoted. This is achieved by operation of the associative memory which augments the value of the positive reinforcement signal applied to the positive reinforcement node y+.

In this application, the associative memory functions as described above with respect to FIG. 3, that is, the reinforcement signals, weight update signals and changes in values of weights are calculated as described with reference to equations (2) to (5) above. Moreover, the associative memory receives input signals from other sensors, such as a temperature sensor $S_1$, and a supplementary ion detector $S_2$ physically spaced apart from the detector $S_A$ and, when it is determined, based on the values of the signals $O_1$, $O_2$ and $O_3$ output by the activation node X, expectation node Y and the motor centre M, that the existing response of the primary response network is inappropriate then the weights applied to the signals received from the temperature sensor $S_1$ and supplementary ion detector $S_2$ are updated so as to increase the values of the positive and negative reinforcement signals.

In this way, depending upon the circumstances which exist when the behaviour of the primary response network is determined to be "inappropriate", the smoke alarm device can become conditioned to output an audible alarm signal when its own detector detects a number of ions exceeding a threshold level AND, for example, the signal output by the temperature sensor $S_1$ indicates an over-threshold temperature and the signal output by the physically spaced apart ion detector $S_2$ indicates an over-threshold number of detected ions.

"Eagle Alarm Call" Generation

As mentioned above, a simulation was performed based on an architecture substantially similar to that described above with reference to FIG. 4 but designed to generate "eagle alarm calls". In this experiment, the activation node X was fed input signals A whose value indicated detection or non-detection of a flying object and the expectation node Y was fed signals B indicative of the detection or non-detection of an audible "eagle alarm call" generated by another agent. The motor centre M was designed such that, when it was triggered, it output a signal to an actuator C for generation of an audible "eagle alarm call" signal. In this experiment, "abnormal" or "inappropriate" behaviour of the primary response network consists either of:

the generation of an "eagle alarm call" by the primary response network in a case where the expectation node Y does not detect an audible "eagle alarm call" generated by another agent, or the non generation of an "eagle alarm call" by the primary response network in a case where the activation node X is triggered and the expectation node Y does detect an audible "eagle alarm call" generated by another agent.

In this experiment, the associative memory received an input signal from a further sensor $S_1$ detecting whether the observed flying object was or was not yellow in colour. In cases where the behaviour of the primary response network was determined to be abnormal (by analysis of the signals $O_1$, $O_2$ and $O_3$ output by the activation node X, expectation node Y and motor centre M), the associative memory updated the appropriate weight applied to the output of the "yellow object" detector $S_1$. In this experiment, since eagles are not yellow, at times when negative reinforcement of the motor centre M was required the output signal from the "yellow object" detector would often be high. Thus, the architecture gradually developed conditioning such that the motor centre M would not produce an output for the generation of an audible "eagle alarm call" signal in cases where the output from the "yellow object" detector S1 indicated that the flying object was yellow.

Figure 5A:
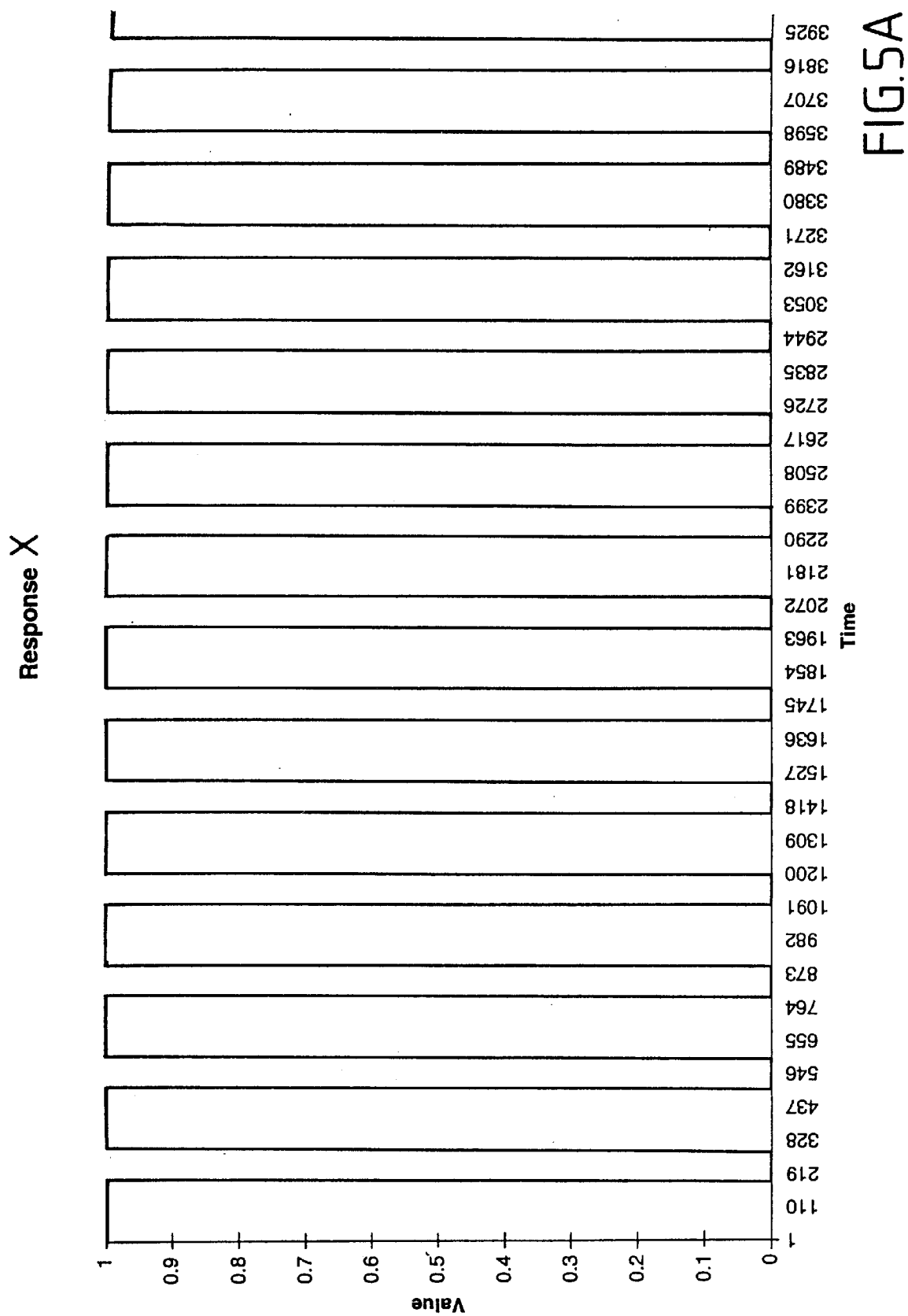
FIG. 5 is a series of graphs illustrating results of an experiment showing how self-biased conditioning affects the output of the primary response network of FIG. 4, wherein FIG. 5a) illustrates the output of an activation node X, FIG. 5b) illustrates the output of an expectation node Y, FIG. 5c) illustrates the output of a motor centre M, and FIG. 5d) groups the three outputs on a single graph.
Figure 5B:
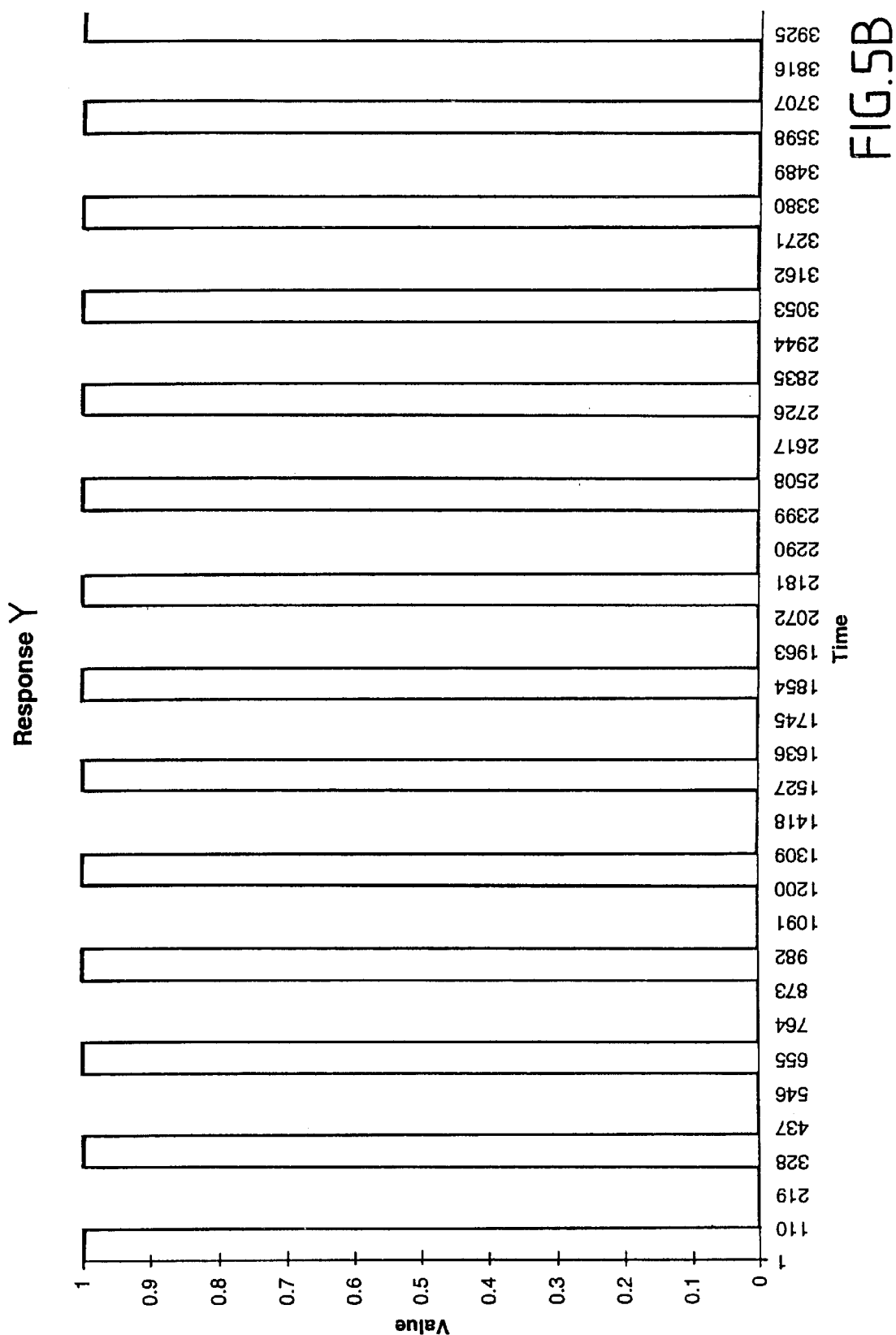
Figure 5D:
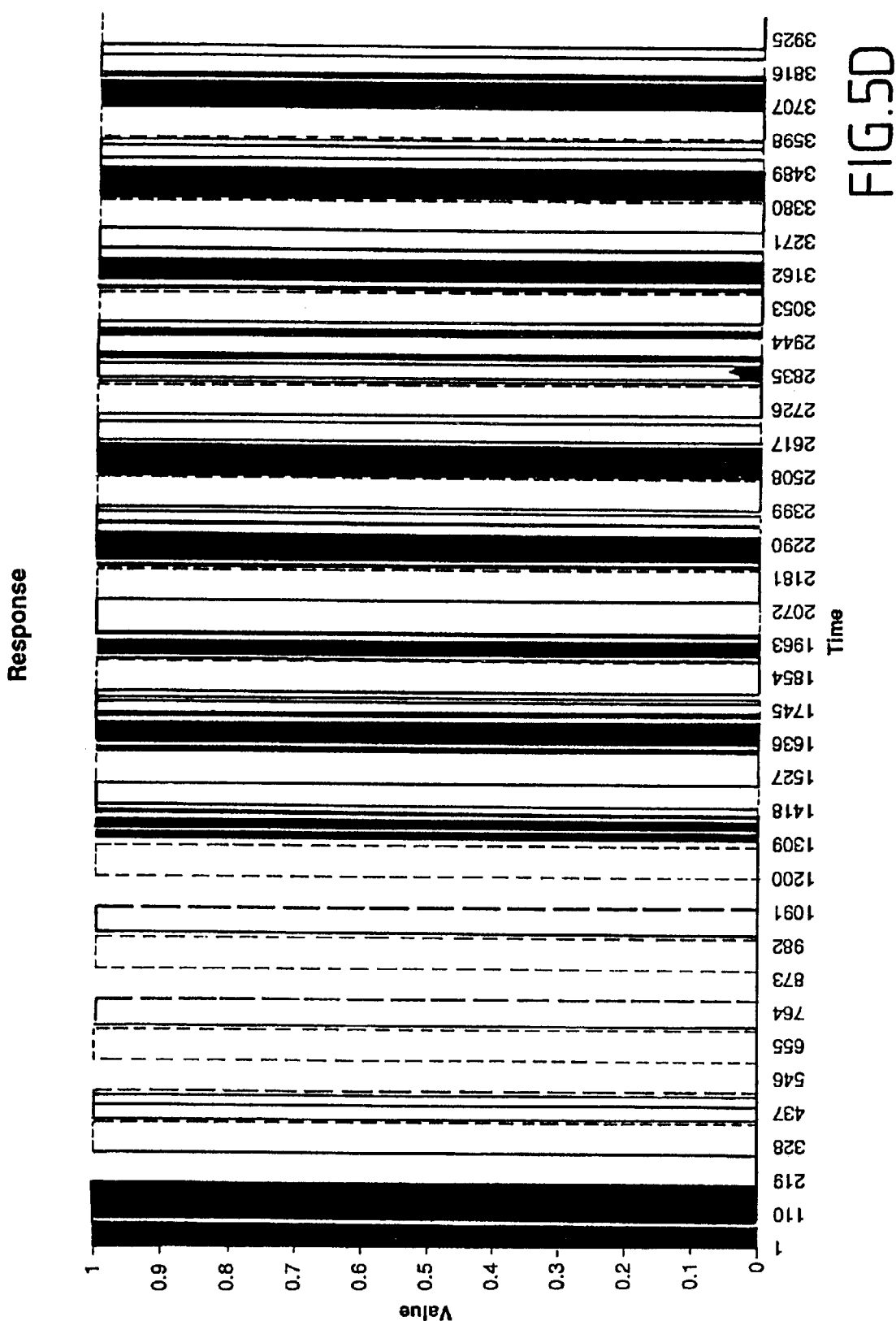
Figure 6A:
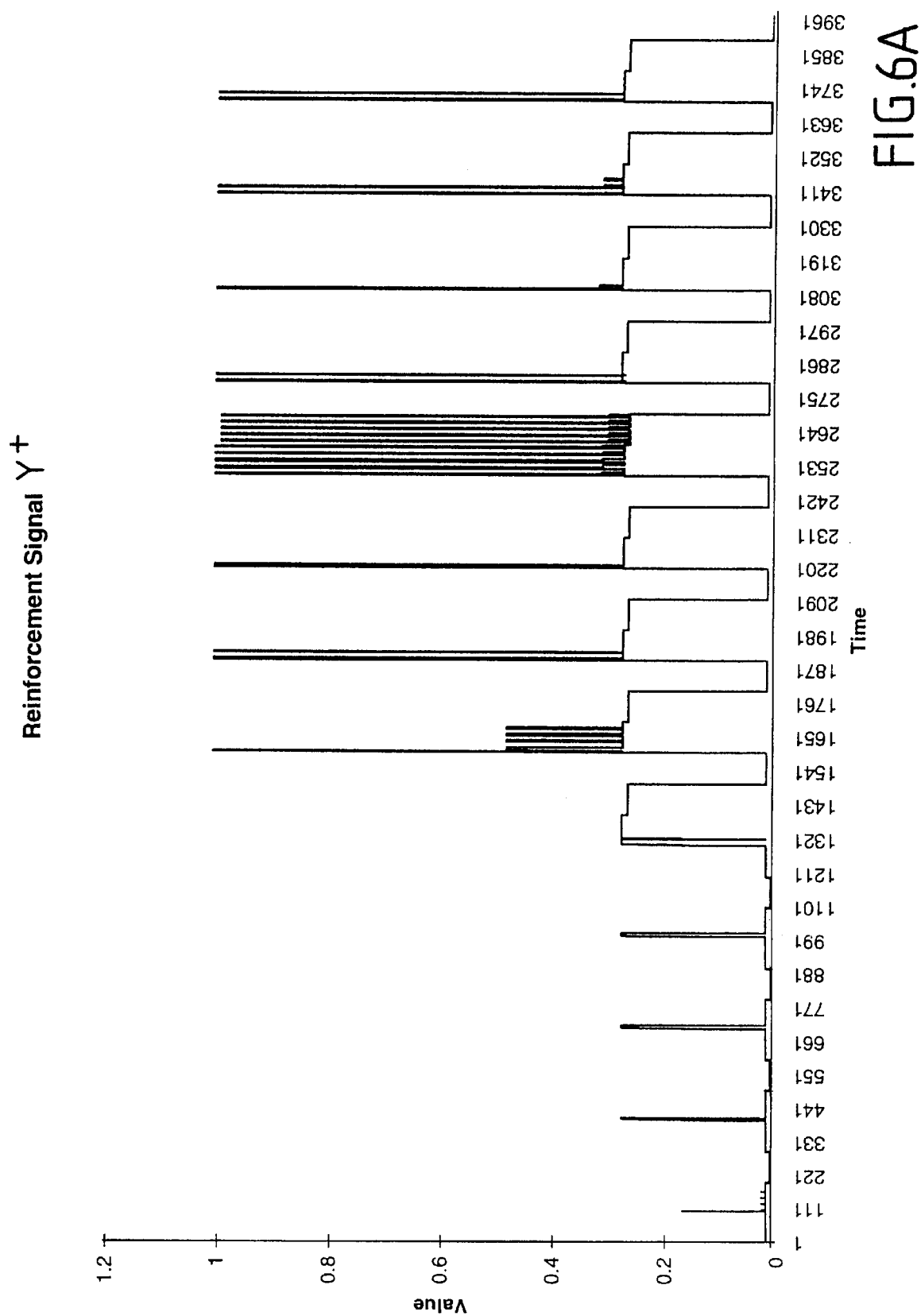
FIG. 6 is a set of graphs illustrating how values of positive and negative reinforcement signals develop during the experiment illustrated by FIG. 5, wherein FIG. 6a) illustrates the positive reinforcement signal, FIG. 6b) illustrates the negative reinforcement signal, and FIG. 6c) combines FIGS. 6a) and 6b)
Figure 6B:
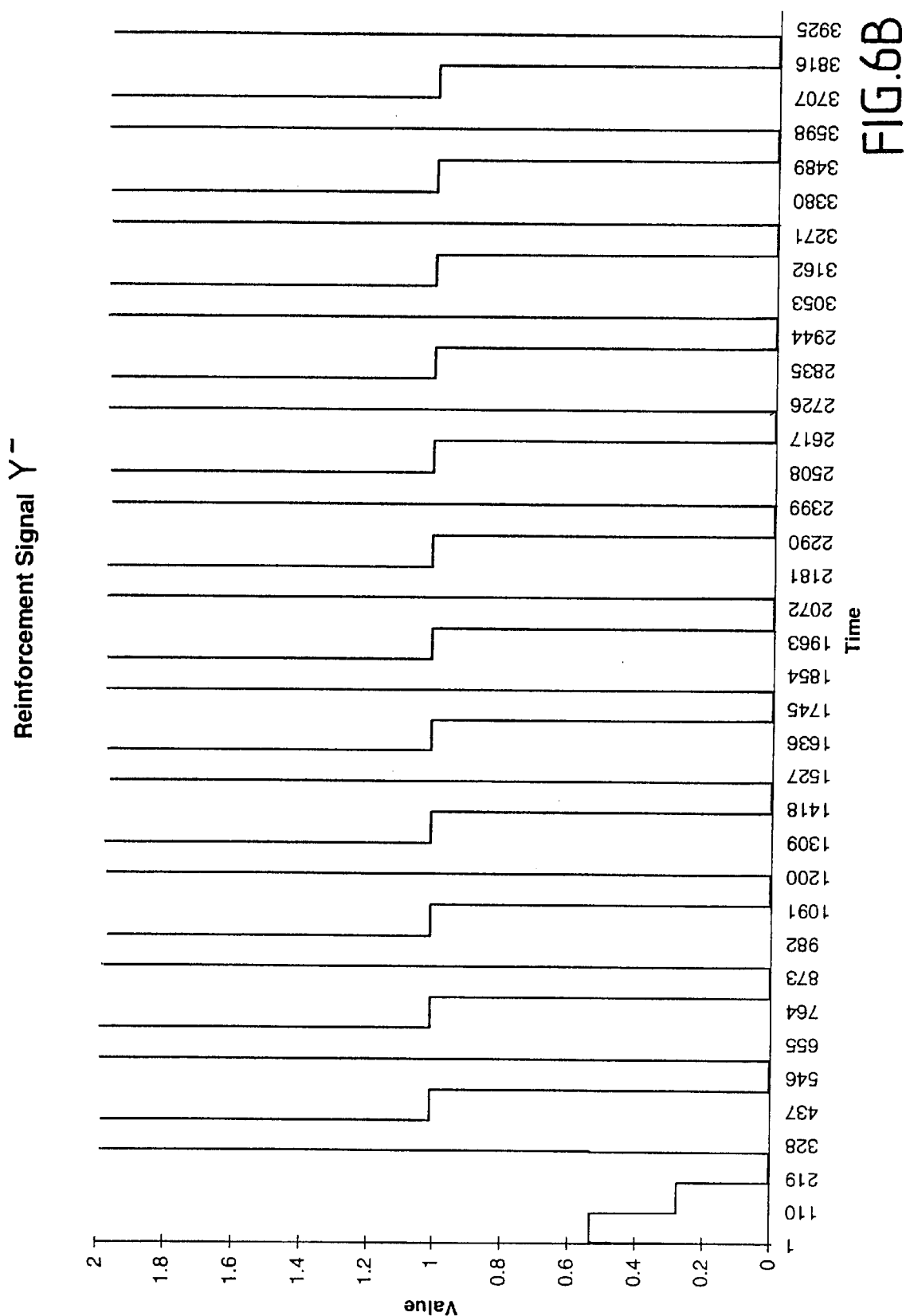
Figure 6C:
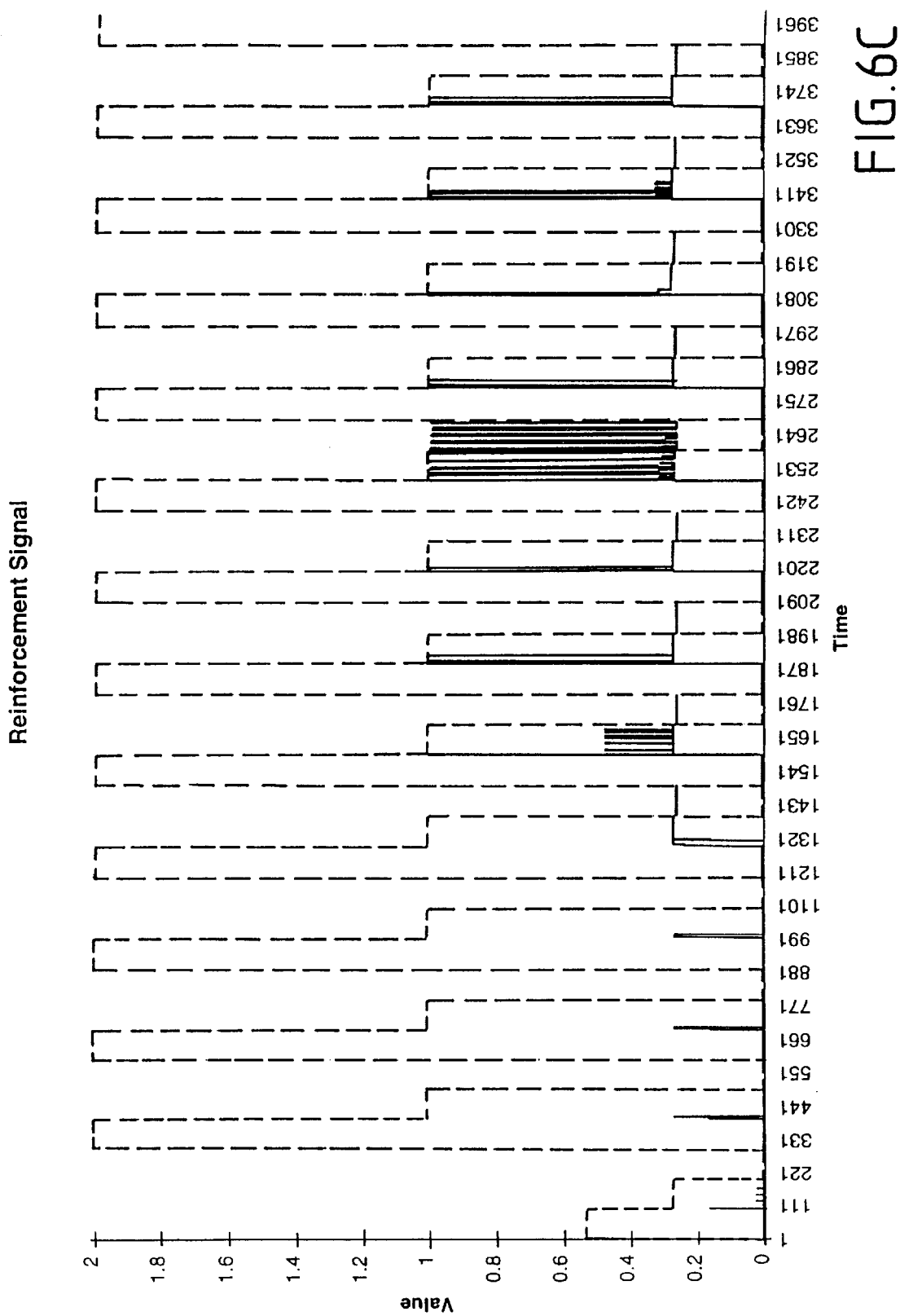
Figure 7:
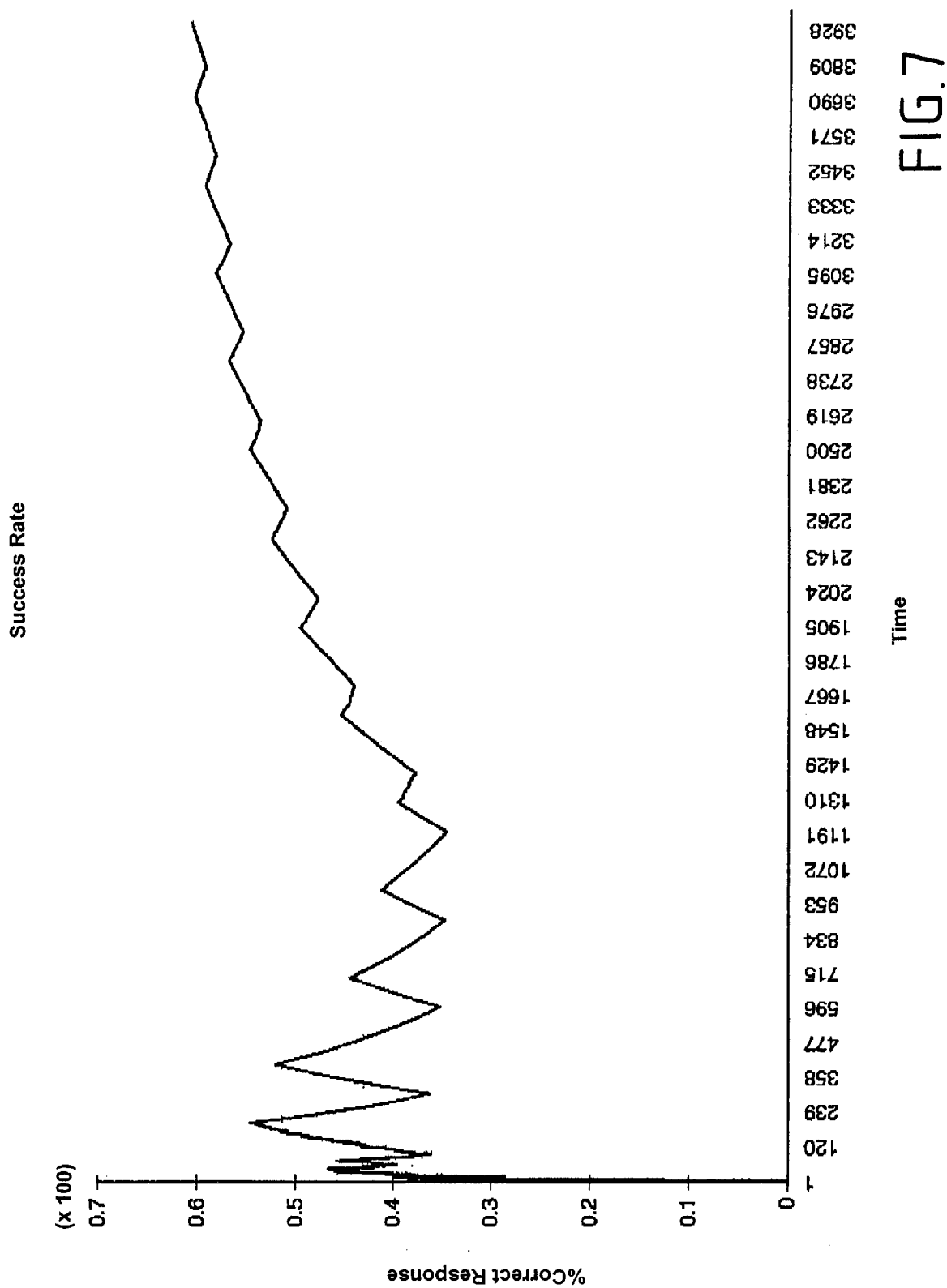
FIG. 7 illustrates how success in generating "eagle alarm calls" improves as the system learns during the experiment illustrated in FIGS. 5 and 6.

FIGS. 5, 6 and 7 are graphs illustrating the results that were obtained in the "eagle alarm call" experiment. In this experiment, the weights used in the associative memory were initially set to 0.01, and in equation (5) $\tau$ was set to 10 and $c_j$ was set to $15.0 \div \Pi_{a=1}^{J} a$. During the experiment, the architecture was alternately presented with the sets of values indicated in Table 1 below:

TABLE 1

| Name of Set of Values | Input to Activation Node ("Flying Object" Sensor) | Input to "Yellow Object" sensor | Input to Expectation Node ("Eagle Alarm Call" Sensor) |
| --- | --- | --- | --- |
| Yellowbird | 1.0 | 1.0 | 0.0 |
| Eagle | 1.0 | 0.0 | 1.0 |
| DetectedAlarm | 0.0 | 0.0 | 1.0 |

More particularly, during the first 100 time steps in the experiment, the set of signals "Yellowbird" was presented to the architecture, then during the next 100 time steps the set of signals "Eagle" was presented, then during the next 100 time steps the set of signals "DetectedAlarm" were presented, and then the sequence repeated.

FIGS. 5*a*) to 5*d*) illustrate how the output signals from the activation node X, expectation node Y and motor centre M changed during the experiment: in each case the x-axis indicates the number of time steps which has elapsed, whereas the y-axis indicates the value of the signal output by the nodes X, Y and M in FIGS. 5*a*), *b*) and *c*) respectively, 1.0 indicating triggering of the X and M nodes and detection of a "non-expected input" by the expectation node Y, whereas 0 represents no triggering of the X and M nodes and detection of the "expected input" by the expectation node Y. FIG. 5*d*) groups all 3 outputs on a single graph.

It will be seen from FIG. 5 that the architecture does indeed, after about 1300 time steps, learn to correctly respond to the set of input signals "Eagle". Furthermore, even for presentation of the "DetectedAlarm" set of signals, the motor centre will often output a signal to trigger generation of an audible "eagle alarm call".

FIGS. 6*a*) and *b*) indicate how the values of the positive and negative reinforcement signals, respectively, change during the experiment. FIG. 6*c*) groups the two responses on a single graph. A signalling pattern is quickly established with respect to negative reinforcement y−, namely, the strongest negative reinforcement is seen for the presentation of the "Yellowbird" set of signals, medium-level negative reinforcement is seen for the presentation of the "Eagle" set of signals and almost no negative reinforcement is seen when the "DetectedAlarm" set of signals is presented.

With respect to positive reinforcement, the pattern is not as marked because positive reinforcement depends upon the probabilistic output from the motor centre M as defined in equation (1). An initial tendency of y+ was to output a positive value for a short period of time just after replacement of the "Yellowbird" set of signals by the "Eagle" set of signals. However, after 1300 time steps this tendency changed: a positive value continued to be output when either the "Eagle" or "DetectedAlarm" set of signals were presented but then it began intermittently to produce a much stronger value as an output value of y+. This intermittent stronger output of y+ enables the architecture to have a positive reaction to the presentation of the "DetectedAlarm" set of signals thereby producing its own "eagle alarm call" when such signals are input.

As shown in FIG. 7, until around 1300 time steps have elapsed the success rate of the system in generating "eagle alarm calls" at appropriate times fluctuates with a tendency to diminish. However, thereafter the success rate improves as the system develops an appropriate secondary response.

SPA Device Adapting to User's Tastes

As mentioned in the introduction, the present invention is particularly useful in applications providing SPA (situated personal assistance) devices. One implementation of such a device learns selectively to generate alarm signals in order to attract the attention of the user to objects which may be of interest to him.

Consider the case where a building, such as the Louvre museum, is provided with transmitters outputting, in a form not directly perceptible to humans, information regarding the properties of the respective different exhibits. An SPA device is provided with sensors adapted to receive the transmitted signals and has one or more primary response networks designed to react to the detection of certain properties of the exhibits by generating a corresponding alarm signal perceptible to the user (e.g. an audible broadcast of the words "$16^{th}$ century painting"). If the user is interested in the corresponding exhibit, the expectation node of the primary response network "expects" that the user will move closer to the exhibit. If this expectation is not fulfilled then the operationi of the primary response network is conditioned by enhancement of the negative reinforcement signal.

It will be understood that the above example can be modified in a wide variety of ways. For example, rather than transmitters being provided for broadcasting the properties of the different exhibits, the SPA device may be provided with sensors which directly detect properties of the exhibits.

Tracking of Objects or Agents

Figure 8:
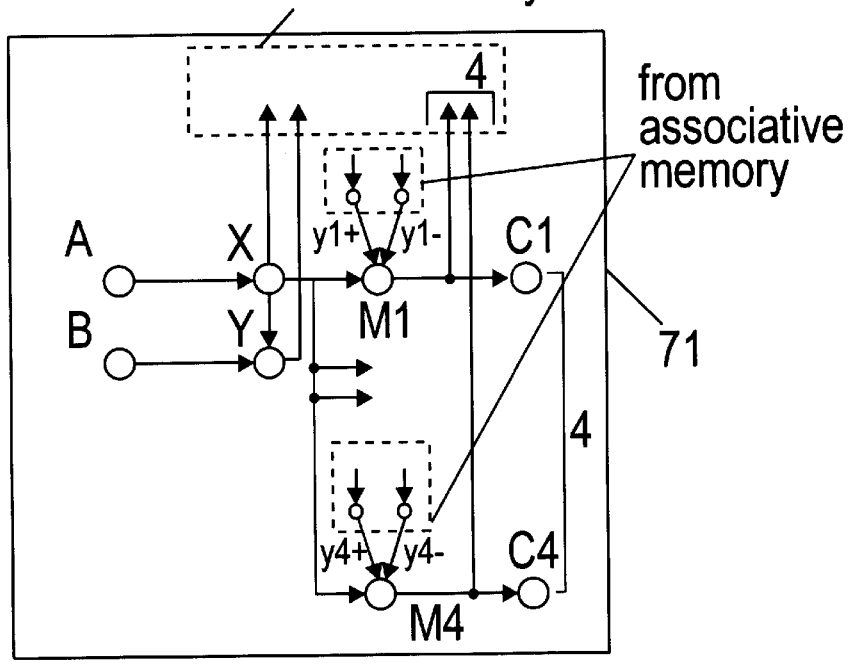
FIG. 8 is an example of a primary response network, provided in an architecture having mobility, adapted to cause the architecture to follow an external agent.

FIG. 8 illustrates the structure of a primary response network 71 adapted for use in a tracking device. Firstly, there will be described a simple mobile device adapted to track a human user with which the device interacts. Next, a more complex case will be discussed in which a SPA device acts as a partner for navigating through a virtual three-dimensional world.

Tracking of Human User

In the primary response network 71, a single activation node X receives an input signal A indicating when the volume of audio signals detected from the human user falls below a threshold level. In such a case, the primary response of the network is to assume that the human user has moved further away from the device and to trigger action to displace the device towards the human user. The activation node X thus sends trigger signals to four motor centres $M_1$ to $M_4$ respectively controlling displacement of the device towards the North, East, South and West. Initially, the probabilities of motion in the northward, eastward, southward or westward directions are all equal.

The device also includes an expectation node Y, activated upon triggering of the activation node X, and receiving as an input a signal B indicating the distance between the mobile device and the human user. If, when the activation node X triggers the expectation node Y, the human user is close to the mobile device then it is not appropriate for the primary response network 71 to trigger motion of the mobile device and the output from the expectation node is +1.0, whereby to signal that triggering of the motor centre is "inappropriate". On the other hand, if the expectation node determines that the human user is indeed far from the mobile device then this is the "expected" finding and the expectation node outputs 0.

In this application also, the associative memory functions as described above with respect to FIG. 3, that is, the reinforcement signals, weight update signals and changes in values of weights are calculated as described with reference to equations (2) to (5) above. Moreover, in this case, the associative memory receives input signals from four sensors indicating, respectively, whether the tracked human user is to the North, East, South or West of the mobile device.

The associative memory determines on the basis of the output signals received from the activation node X, expectation node Y and four motor centres $M_1$ to $M_4$ whether or not the primary response of the network 71 is "abnormal" and, if so, generates weight update signals for the respective positive or negative reinforcement signal components $y_1^+$, $y_1^-, y_2^+, y_2^-, y_3^+, y_3^-, y_4^+, y_4^-$, as required. This architecture gradually learns to move in the correct direction in order to approach the tracked human user in cases where the volume of audio signals received from the user drops and the user is, indeed, far away.

In a case where the human user himself approaches the mobile device upon noticing that he is far away from it, the conditioning of the architecture for "tracking" will not be triggered. Thus, this architecture is better adapted for tracking agents which seek to flee than for tracking agents which tend to approach of their own accord.

SPA Device as a Partner to Navigation in Virtual World

Another implementation of an SPA (situated personal assistance) device serves as a partner for a human user navigating in a three-dimensional virtual world. VRML 2.0 is a protocol which has been developed to allow different human users to interact with one another in a "virtual world". Typically, the human user will use a general purpose computer to access such a "virtual world" via a telecommunications network. The "virtual world" is managed by a remote computer and can be observed on the user's computer screen as if it were a three-dimensional world. Typically, the user interacts with other human users by using mobile three-dimensional characters.

FIG. 9 illustrates a case where two human users are interacting in such a virtual world by the intermediary of three-dimensional characters (or avatars) here represented as cones. Each of the human users has an SPA device which gives rise to a representation (avatar) in the virtual world (here shown as a cylinder).

In this case it is useful if the SPA device has at least two primary response networks, the first of which implements a tracking function enabling it to track the avatar of its human partner through the virtual world, as well as to track avatars of other human users and their SPAs, whereas the second primary response network generates "avatar alarm" signals. At first, the "tracking" primary response network is adapted to approach only the avatar of its human partner. If other avatars are detected as being within a certain distance of the avatar of the SPA then the "avatar alarm" primary response network generates an "avatar alarm" call. Moreover, a signal indicating "undesirable proximity of others" is generated and fed to the tracking primary response network. If the human partner of the SPA does not respond to the "avatar alarm call" then the SPA becomes conditioned to suppress this call and to suppress generation of the signal indicating "undesirable proximity of others". Thus, the "tracking" primary response network becomes conditioned to approach other avatars as well as that of its human partners. Experiments in such a virtual world have demonstrated that this is indeed the way in which the behaviour of the SPA device adapts.

System Optimising Probability of Receiving Appropriate External Aid

FIG. 10 illustrates the structure of a primary response network 91 used in a system which optimises an output so as to maximise the likelihood of receiving a remedial external input in the case where the system has an unfulfilled operational requirement (or "need"). Besides optimising its chances of having its operational requirement met as swiftly as possible, such a system also is likely to create sympathy in a human user. The primary response network 91 illustrated by FIG. 10 can be used to implement the architecture proposed by the present inventor in "Innate Sociability: Sympathetic Coupling" in the Proceedings of the AAAI Fall Symposium on Socially Intelligent Agents, 1997, pages 98–102.

The primary response network 91 of FIG. 10 has a single activation node X, triggered by an internal sensor indicating the existence of some unfulfilled operational requirement system (e.g. low battery voltage) within an application module of the system (e.g. a voltage regulator). When triggered, the activation node X activates two motor centres, a first motor centre $M_1$ which produces an audio alarm signal C indicating the existence of an unfulfilled operational need in the system, and a second motor centre $M_2$, which regulates the application module via an internal regulator D.

This network has two expectation nodes, a first node $Y_1$, receiving an input from an acoustic sensor $B_1$, and a second expectation node $Y_2$, receiving an input from a sensor $B_2$ indicating normal behaviour of the application module in question. These two expectation nodes are activated when the activation node X is triggered.

The associative memory once again functions as described above with reference to equations (2) to (5). Weight update signals for components of the positive and negative reinforcement signals generated for motor centre $M_1$ are based on output signals from X, $Y_1$ and $M_1$, whereas weight update signals for components of the positive and negative reinforcement signals generated for motor centre $M_2$ are based on output signals from X, $Y_2$ and $M_2$.

When an unfulfilled operational requirement arises in the application module this is detected by the activation node X which triggers internal regulation via the motor centre $M_2$. In view of the fact that external intervention will be necessary in order to fulfil certain operational requirements, the activation node also activates the motor centre $M_1$ to generate an output C perceptible to external agents.

The expectation node $Y_2$ is adapted to expect that this internal regulation will lead to satisfaction of the operational requirement and so, if this does not occur, it will indicate "abnormal" operation. The expectation node $Y_1$ is adapted to expect to detect at least the output C.

The system runs, while outputs from other sensors are also being monitored (via the associative memory 2). While the operational requirement rests unfulfilled, the system acquires some active sensor inputs as negative factors tending to inhibit internal regulation, eventually this will bring the internal regulation by motor centre $M_2$ to a halt. However, the halting of this internal regulation by motor centre $M_2$ will itself represent soon "abnormal" behaviour and positive reinforcement will begin. Positive and negative reinforcement run simultaneously and continue to change the weights of nodes corresponding to "active" sensors. This continues until the operation of the system normalises. At which time, the system has learned a critical set of sensor inputs that results in normalisation (that is, fulfilment of the operational requirement of the application module).

In a case where external intervention was essential to fulfil the operational requirement of the application modules, one of the critical factors may well be generation of the output signal C by motor centre $M_1$. Thus, the system learns a secondary response consisting of generation of output C, and performing of internal regulation, when the other critical sensor inputs take the values applicable at a time when normalisation of the system is required. This will generally lead to the system optimising the output C so as to maximise the probability of obtaining external aid. This can also lead to generation of the output C, and triggering of internal regulation processes, even at times when the application module itself does not have an unfulfilled operational requirement. However, in certain circumstances this is desirable, since the system will appear to be acting "in sympathy" with some external agent or external factors.

It will be appreciated from the foregoing description that the present invention provides a self-biased conditioning architecture and self-biased conditioning scheme which have the following characteristics:

they provide a developmental strategy for a system, the system consisting of a set of primary response networks, which are very general, and an associative network;

"reward" is always internally produced based on its self-biased expectation; the worth or reward is relative to presupposed actions of architecturally definitive primary response networks; and the original primary response networks do not change; even after conditioning (learning), each of the primary response networks keeps its original pattern of activation, although inhibition and promotion effects which can vary with time act on the motor centre and affect the output from the network.

Numerous other variations and modifications, besides those discussed above, can be made to the basic preferred embodiment described above, within the scope of the present invention as defined in the appended claims.

What is claimed is:

1. System implementing self-based conditioning, comprising:

a plurality of sensors, at least one actuator;

at least one primary network receiving an input signal from a least one first sensor and an input signal from at least one second sensor and generating an output signal for activating an actuator wherein the primary response network comprises:

an activation node receiving the input signal from said at least one first sensor and, in response to a first value of said input signal, outputting trigger signal, at least one motor centre receiving the trigger signal from the activation node and adapted to respond to the trigger signal by generating said output signal for activating said actuator.

means for applying positive and negative reinforcement signals to the motor centre whereby to promote or inhibit the response of the motor centre to the trigger from the activation node, and at least one expectation node receiving the input signal from the at least one second sensor said input signal from the second sensor being indicative if whether or not the generation of said output signal for activating the actuator is appropriate, and for generating an output signal indicating when the generation of said output signal for activating the actuator is not appropriate;

means for determining, based on an analysis of at least signals output by the expectation node and motor centre of the primary response network, that the response of the motor centre requires promotion or inhibition; and an associative memory generating said positive and negative reinforcement signals based upon the determination made by the determination means;

wherein the or each expectation node of the primary response network is adapted to produce an output signal only when activated by an activation signal from a corresponding activation node.

2. The system according to claim 1, wherein said at least one second sensor is adapted to detect activity by a user indicative of whether or not the generation of said output signal for activating the actuator is appropriate at that time.

3. System implementing self-based conditioning, comprising:

a plurality of sensors, at least one actuator;

at least one primary network receiving an input signal from a least one first sensor and an input signal from at least one second sensor and generating an output signal for activating an actuator wherein the primary response network comprises:

an activation node receiving the input signal from said at least one first sensor and, in response to a first value of said input signal, outputting a trigger signal, at least one motor centre receiving the trigger signal from the activation node and adapted to respond to the trigger signal by generating said output signal for activating said actuator, means for applying positive and negative reinforcement signals to the motor centre whereby to promote or inhibit the response of the motor centre to the trigger from the activation mode, and at least one expectation node receiving the input signal from the at least one second sensor said input signal from the second sensor being indicative if whether or not the generation of said output signal for activating the actuator is appropriate, and for generating an output signal indicating when the generation of said output signal for activating the actuator is not appropriate;

means for determining, based on an analysis of at least signals output by the expectation node and motor centre of the primary response network, that the response of the motor centre requires promotion or inhibition; and an associative memory generating said positive and negative reinforcement signals based upon the determination made by the determination means;

wherein the associative memory is adapted to generate the positive and negative reinforcement signals based on the output signal from at least one sensor multiplied by a respective weight.

4. The system according to claim 3, wherein the associative memory (2) is adapted to apply respective weights ($w_i^+$, $w_i^-$) the values of which are updated at times when the determination means determines that the response of the corresponding motor centre (M) requires promotion or inhibition.

5. The system according to claim 4, wherein the values of the respective weights ($w_i^+$, $w_i^-$) are calculated according to the following equation:

$$\Delta w_i(t) = g \sum_{j=1}^{\tau} c_j |w_i(t-j)| [\Delta x_i(t-j)]^+$$

where $[\Delta x_i(t-j)]^+ = \max(\Delta x_i(t-j), 0)$, $\Delta w_i(t)$ represents the change made at time t to the weight applied to the signal ($x_i$) output by the sensor (Si), that is, the change in the value of the weight applied for the time interval t and that applied for the time interval t+1, $\Delta x_i(t-j)$ represents the change observed at time interval (t-j) in the value of the signal ($x_i$) output by the sensor ($S_i$), that is, the change in the value of the signal $x_i$ between that observed during time interval t-j-1 and that observed during time interval t-j, $\tau$ is a positive constant indicative of a time period over which the system holds data for determination of $w_i(t)$ and $\Delta x_i(t)$, $c_j$ is an empirically-determined learning-rate constant that is proportional to the effectiveness of the conditioning when the inter-stimulus interval is j, and g is 1 when the weights are being updated and 0 when the weights are not being updated.

6. System implementing self-based conditioning, comprising:

a plurality of sensors, at least one actuator;

at least one primary network receiving an input signal from a least one first sensor and an input signal from at least one second sensor and generating an output signal for activating an actuator wherein the primary response network comprises:

an activation node receiving the input signal from said at least one first sensor and, in response to a first value of said input signal, outputting a trigger signal, at least one motor centre receiving the trigger signal from the activation node and adapted to respond to the trigger signal by generating said output signal for activating said actuator, means for applying positive and negative reinforcement signals to the motor centre whereby to promote or inhibit the response of the motor centre to the trigger from the activation node, and at least one expectation node receiving the input signal from the at least one second sensor said input signal from the second sensor being indicative if whether or not the generation of said output signal for activating the actuator is appropriate, and for generating an output signal indicating when the generation of said output signal for activating the actuator is not appropriate;

means for determining, based on an analysis of at least signals output by the expectation node and motor centre of the primary response network, that the response of the motor centre requires promotion or inhibition; and an associative memory generating said positive and negative reinforcement signals based upon the determination made by the determination means;

wherein the plurality of sensors include at least one sensor to internal conditions in the system.

7. System implementing self-based conditioning, comprising:

a plurality of sensors, at least one actuator;

at least one primary network receiving an input signal from a least one first sensor and an input signal from at least one second sensor and generating an output signal for activating an actuator wherein the primary response network comprises:

an activation node receiving the input signal from said at least one first sensor and, in response to a first value of said input signal, outputting a trigger signal, at least one motor centre receiving the trigger signal from the activation node and adapted to respond to the trigger signal by generating said output signal for activating said actuator, means for applying positive and negative reinforcement signals to the motor centre whereby to promote or inhibit the response of the motor centre to the trigger from the activation node, and at least one expectation node receiving the input signal from the at least one second sensor said input signal from the second sensor being indicative if whether or not the generation of said output signal for activating the actuator is appropriate, and for generating an output signal indicating when the generation of said output signal for activating the actuator is not appropriate;

means for determining, based on an analysis of at least signals output by the expectation node and motor centre of the primary response network, that the response of the motor centre requires promotion or inhibition; and an associative memory generating said positive and negative reinforcement signals based upon the determination made by the determination means;

wherein the at least one actuator includes an actuator regulating an internal condition in the system.

8. System implementing self-based conditioning, comprising:

a plurality of sensors, at least one actuator;

at least one primary network receiving an input signal from a least one first sensor and an input signal from at least one second sensor and generating an output signal for activating an actuator wherein the primary response network comprises:

an activation node receiving the input signal from said at least one first sensor and, in response to a first value of said input signal, outputting a trigger signal, at least one motor centre receiving the trigger signal from the activation node and adapted to respond to the trigger signal by generating said output signal for activating said actuator, means for applying positive and negative reinforcement signals to the motor centre whereby to promote or inhibit the response of the motor centre to the trigger from the activation node, and at least one expectation node receiving the input signal from the at least one second sensor said input signal from the second sensor being indicative if whether or not the generation of said output signal for activating the actuator is appropriate, and for generating an output signal indicating when the generation of said output signal for activating the actuator is not appropriate;

means for determining, based on an analysis of at least signals output by the expectation node and motor centre of the primary response network, that the response of the motor centre requires promotion or inhibition; and an associative memory generating said positive and negative reinforcement signals based upon the determination made by the determination means;

incorporated into an alarm device.

9. System implementing self-based conditioning, comprising a plurality of sensors, at least one actuator;

at least one primary network receiving an input signal from a least one first sensor and an input signal from at least one second sensor and generating an output signal for activating an actuator wherein the primary response network comprises:

an activation node receiving the input signal from said at least one first sensor and, in response to a first value of said input signal, outputting a trigger signal, at least one motor centre receiving the trigger signal from the activation node and adapted to respond to the trigger signal by generating said output signal for activating said actuator, means for applying positive and negative reinforcement signals to the motor centre whereby to promote or inhibit the response of the motor centre to the trigger from the activation node, and at least one expectation node receiving the input signal from the at least one second sensor said input signal from the second sensor being indicative if whether or not the generation of said output signal for activating the actuator is appropriate, and for generating an output signal indicating when the generation of said output signal for activating the actuator is not appropriate;

means for determining, based on an analysis of at least signals output by the expectation node and motor centre requires promotion or inhibition; and an associative memory generating said positive and negative reinforcement signals based upon the determination made by the determination means;

incorporated into a device providing situated personal assistance, wherein said at least one second sensor is adapted to detect activity by a user indicative of whether or not the generation of said output signal for actuator is appropriate at that time.

* * * * *